(12) United States Patent
Emmons, Jr. et al.

(10) Patent No.: US 6,491,257 B1
(45) Date of Patent: Dec. 10, 2002

(54) TECHNIQUE FOR SATELLITE CONSTELLATION GROWTH

(75) Inventors: Thomas Peter Emmons, Jr., Mesa, AZ (US); Richard Scott Torkington, Mesa, AZ (US); James Edmund Klekotka, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/417,062

(22) Filed: Oct. 13, 1999

(51) Int. Cl.⁷ .................................................. H04Q 7/20
(52) U.S. Cl. ................................ 244/158 R; 455/13.1; 455/12.1
(58) Field of Search ................................ 455/12.1, 13.1, 455/13.2, 427, 430, 431, 429, 428; 342/352–354, 355, 356–357.01, 357.07, 357.08, 357.11, 357.16, 357.17, 359, 360; 701/13, 226; 244/158 R

(56) References Cited

U.S. PATENT DOCUMENTS

| | | | | |
|---|---|---|---|---|
| 4,809,935 A | * | 3/1989 | Draim | 244/158 R |
| 5,199,672 A | * | 4/1993 | King et al. | 244/158 R |
| 5,274,382 A | * | 12/1993 | Wills et al. | 342/359 |
| 5,471,641 A | * | 11/1995 | Dosiere et al. | 455/13.1 |
| 5,483,664 A | * | 1/1996 | Moritz et al. | 455/12.1 |
| 5,561,838 A | * | 10/1996 | Chandos et al. | 455/13.1 |
| 5,579,536 A | * | 11/1996 | Stackman et al. | 342/357.17 |
| 5,657,323 A | * | 8/1997 | Jan et al. | 370/252 |
| 5,666,648 A | * | 9/1997 | Stuart | 342/352 |
| 5,806,801 A | * | 9/1998 | Steffy et al. | 244/158 R |
| 5,813,634 A | * | 9/1998 | Pizzicaroli et al. | 244/158 R |
| 5,867,783 A | * | 2/1999 | Horstein et al. | 455/427 |
| 5,930,679 A | * | 7/1999 | Olds et al. | 455/12.1 |
| 5,949,369 A | * | 9/1999 | Bradley et al. | 342/352 |
| 5,978,653 A | * | 11/1999 | Taylor et al. | 455/13.1 |
| 6,007,027 A | * | 12/1999 | Diekelman et al. | 244/158 R |
| 6,011,951 A | * | 1/2000 | King et al. | 455/13.2 |
| 6,032,902 A | * | 3/2000 | Palmade et al. | 244/158 R |
| 6,128,575 A | * | 10/2000 | Croom et al. | 701/226 |
| 6,185,407 B1 | * | 2/2001 | Watson | 455/9 |
| 6,198,907 B1 | * | 3/2001 | Torkington et al. | 455/12.1 |
| 6,223,019 B1 | * | 4/2001 | Briskman et al. | 244/158 R |
| 6,249,513 B1 | * | 6/2001 | Malarky | 370/316 |

OTHER PUBLICATIONS

Roger R Bate, Fundamentals of Astrodynamics, 1971 pp. 140–143, 167–171.*

* cited by examiner

*Primary Examiner*—Dwayne Bost
*Assistant Examiner*—Jean A Gelin
(74) *Attorney, Agent, or Firm*—Ingrassia Fisher & Lorenz, P.C.

(57) ABSTRACT

Due to the large up front cost in fielding a full capacity satellite constellation (100), it is desirable to have the ability to modify the constellation after deployment to add more capacity in a fashion that does not interrupt service, in order to satisfy a variable or growing market demand. In a satellite constellation including a plurality of orbital planes, each of the orbital planes precesses at a known rate. This invention employs deliberate dynamic manipulation of the orbital precession rates for different satellite planes to increase the separation distance between two adjacent planes. A new plane is then inserted between the two adjacent planes to increase the number of planes and increase the capacity. By continuing a gradual variation, a new orbital plane can be added periodically, e.g. once a year, and the variation can be stopped when no additional orbital planes are desired.

10 Claims, 4 Drawing Sheets

TECHNIQUE FOR SATELLITE CONSTELLATION GROWTH

FIELD OF THE INVENTION

This invention relates to a method for satellite constellation growth and more specifically to a method for adding capacity to a satellite communications network over time.

BACKGROUND OF THE INVENTION

At the present time, communications networks are being formed using space vehicles, or satellites. Several different types of networks using different types of satellites can be provided. For example, geo-synchronous satellites are used in many instances to provide fixed signals (e.g. television, telephone etc.) between fixed points.

An example of a more fluid system is one in which low flying satellites are provided in orbits that cooperate to form a constellation. Generally, more than one satellite is provided in the same orbit but spaced from the other satellites in the orbit to provide continuous coverage of the surface of the earth. The orbit defines a plane that may be, for example, a polar plane (or orbit) and a constellation is generally formed by a plurality of planes.

Due to the large up-front financial and time investment involved in fielding a satellite constellation, these systems or networks often do not reach peak capacity for a number of years after the initial start up. Once peak communications capacity is achieved, most constellation designs have no fundamental provision to add capacity, except for wholesale replacement of satellites with those having increased functionality. In many instances, it would be desirable to be able to incrementally modify the constellation after initial deployment to add more capacity in a fashion that does not interrupt service.

Accordingly, it is highly desirable to provide a method to grow a satellite constellation in an incremental fashion and without interruption in service.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DESCRIPTION OF THE PREFERRED EMBODIMENT

A "satellite" is defined herein to mean a man-made object or vehicle intended to orbit the earth. A "constellation" is defined herein to mean an ensemble of satellites arranged in orbits for providing specified coverage (e.g., radio communication) for portion(s) or all of the earth. A constellation typically includes multiple rings (or planes) of satellites and can have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The present invention is applicable to systems including satellites having low-earth, medium-earth and geo-synchronous orbits. Additionally, it is applicable to orbits having any angle of inclination (e.g., polar, equatorial or other orbital patterns). "Precession" is defined by a rotation of the line of nodes of the orbit.

Figure 1:
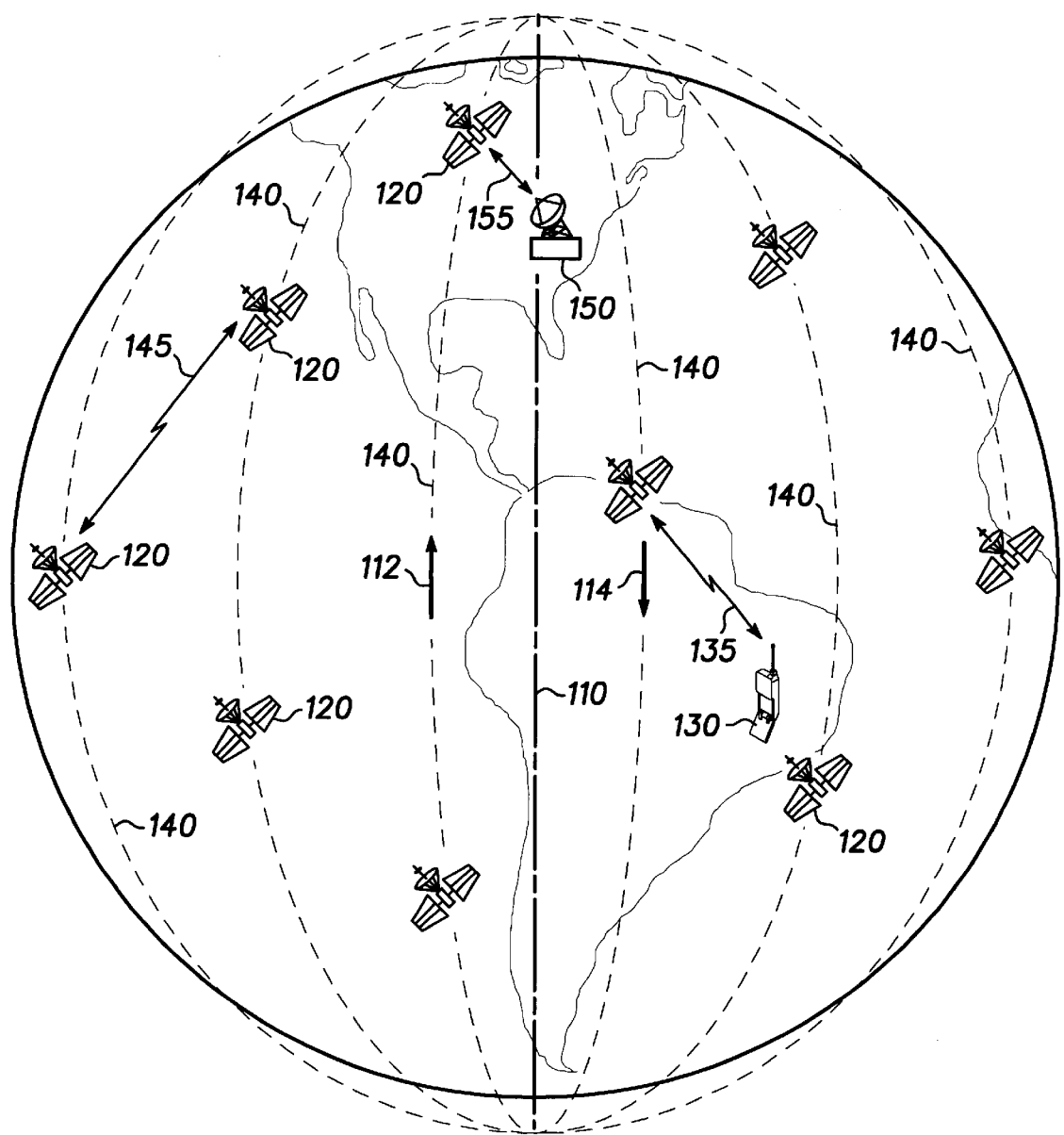
FIG. 1 illustrates a highly simplified diagram of a satellite-based communication system in accordance with a preferred embodiment of the present invention.

FIG. 1 illustrates a highly simplified diagram of a satellite-based communication system in accordance with a preferred embodiment of the present invention. Communication system 100 comprises communication satellites 120, communication units (CUs) 130, and terrestrial stations 150.

Communication satellites 120 are illustrated using six polar orbits 140, with each orbit 140 holding eleven satellites 120 for a total of sixty-six satellites 120. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 120.

In a preferred embodiment, satellites in each orbit 140 encircle earth at an altitude of around 780 km, although higher or lower orbital altitudes may be usefully employed. Because of the relative movement between communication satellites 120 and CUs 130, communication link 135 is a temporary one and hand-off schemes are employed to realize a continuous communication channel.

Communication satellites 120 communicate with other nearby communication satellites 120 through cross-links 145. Communication satellites 120 communicate with terrestrial stations 150 using communication links 155. Communication satellites 120 communicate with communication units 130 using communication links 135.

Terrestrial stations 150 can include earth terminals (ETs). Terrestrial stations 150 can be system control centers or connected to one or more system control centers. Terrestrial stations 150 can also be gateways or connected to one or more gateways (GWs), which provide access to a public switched telephone network (PSTN) or other communications facilities. One CU 130 and one terrestrial station 150 are shown in FIG. 1 for clarity and ease of understanding.

CUs 130 may be located anywhere on the surface of the earth or in the atmosphere above the earth. CUs 130 are preferably communications devices capable of transmitting data to and receiving data from communication satellites 120. By way of example, CUs 130 may be hand-held, portable cellular telephones adapted to communicate with communication satellites 120.

Links 135, 145, and 155 encompass a limited portion of the electromagnetic spectrum that is divided into numerous channels. Links 135, 145, and 155 are preferably combinations of L-Band, S-band, and Ku-band frequency channels and can encompass Frequency Division Multiplex Access (FDMA) and/or Time Division Multiple Access (TDMA) communications (infra) and/or Code Division Multiple Access (CDMA) or combination thereof.

In a preferred embodiment, each satellite 120 can send messages to or receive messages from terrestrial stations 150 and to or from many CUs 130 at any given instant. The terrestrial station is responsible for maintaining data records for the satellites. Data records can include position, velocity, and precession rate. In addition, terrestrial stations 150 desirably monitor the health and status of communication system 100 and manage the operations of communication system 100. Terrestrial stations 150 desirably include antennas and RF transceivers and preferably perform telemetry, tracking, and control functions for the constellation of communication satellites 120.

Preferably, all communication satellites 120 within communication system 100 include cross-link components, earth-link components, subscriber link components, and attitude adjustment components. The attitude adjustment components are used to maintain and/or change one or more of the orbital parameters of the satellite.

Seam 110 is also illustrated in FIG. 1. Seam 110 occurs between two adjacent counter-rotating planes. Two adjacent planes in which the satellites are moving in opposition directions are shown in FIG. 1, as illustrated by arrows 112 and 114.

Polar orbits are illustrated but are not required for the invention.

As will be understood by those skilled in the art, a satellite orbiting the Earth (polar orbits are illustrated for this specific example) defines an orbital plane through the Earth. Generally, more than one satellite is provided in the same orbit but spaced from the other satellites in the orbit to provide continuous coverage of the Earth's surface. At least for purposes of this disclosure, a plurality of interconnected satellites located in a plurality of orbital planes defines a satellite constellation.

Figure 2:
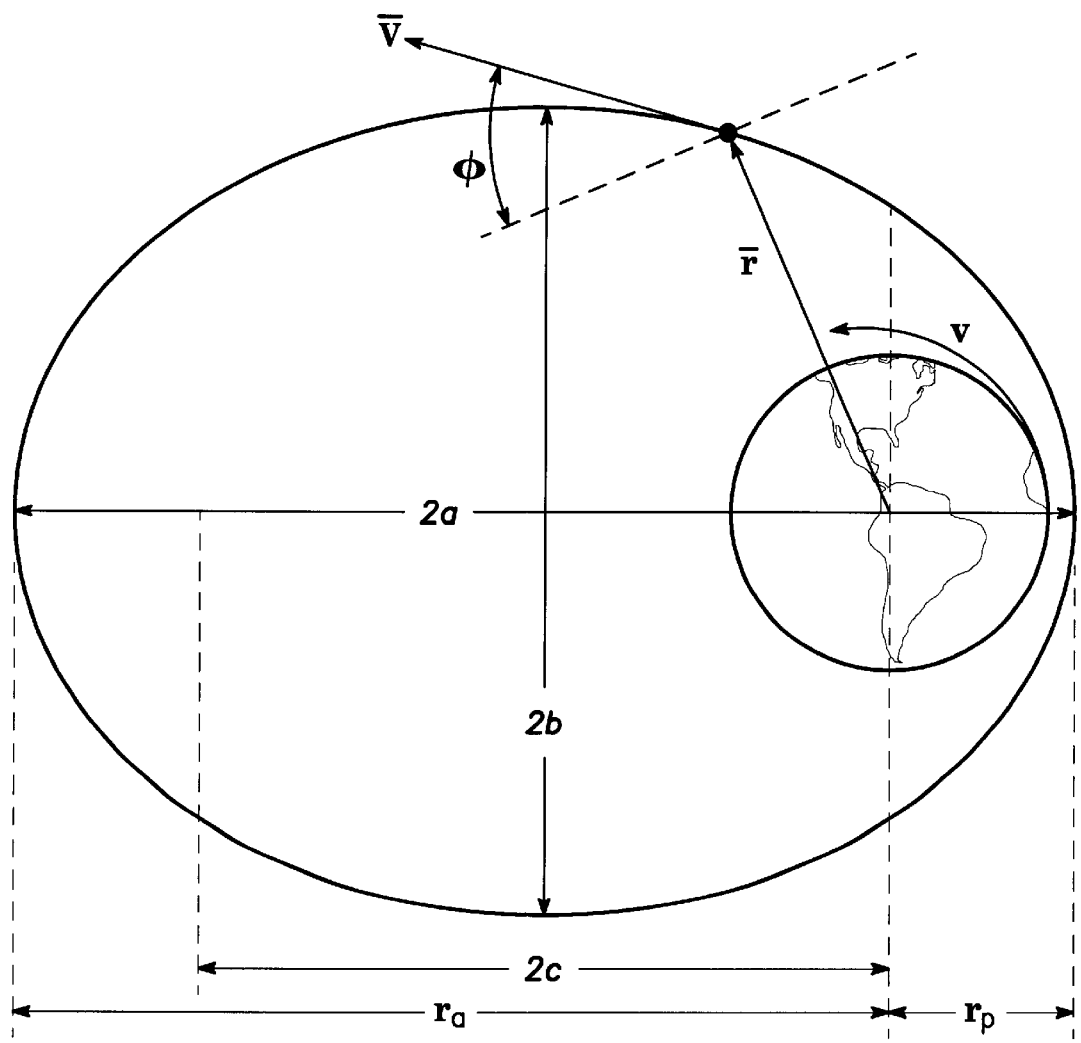
FIG. 2 illustrates a simplified diagram of the geometry of an ellipse and orbital parameters in accordance with a preferred embodiment of the present invention.

FIG. 2 illustrates a simplified diagram of the geometry of an ellipse and orbital parameters in accordance with a preferred embodiment of the present invention. In FIG. 2, the essential parameters of an elliptical orbit are depicted. The essential parameters depicted in FIG. 2 are defined as follows:

$\bar{r}$ is a position vector of the satellite relative to the center of the Earth;

$\bar{V}$ is a velocity vector of the satellite relative to the center of the Earth;

f is the flight-path-angle, the angle between the velocity vector and a line perpendicular to the position vector;

a is the semi-major axis of the ellipse;

b is the semi-minor axis of the ellipse;

c is the distance from the center of the orbit to one of the foci;

v is the polar angle of the ellipse;

$r_a$ is the radius of apogee, the distance from the center of the Earth to the farthest point on the ellipse; and $r_p$ is the radius of perigee, the distance from the center of the Earth to the point of closest approach to the Earth.

The eccentricity, e, of the ellipse (not shown in FIG. 2) is equal to c/a and is a measure of the deviation of the ellipse from a circle.

The inclination, i, of an orbital plane, is the angle that the plane makes with the equator. As an example, each of orbital planes 140 illustrated in the simplified satellite constellation of FIG. 1 makes nearly a ninety-degree angle with the equator. It is understood, however, by those skilled in the art that a satellite network containing a plurality of orbital planes must be designed so that the planes include at least a small amount of inclination so that the satellites do not collide in the polar regions.

An orbital plane precesses according to the following formula:

$$W = -2.06474 \times 10^{14} \, a^{-7/2} \, (\cos i) \, (1-e^2)^{-2}$$

where:

a is the semi-major axis in km;

e is the eccentricity;

I is the inclination; and w is the precession rate in degrees per day.

Generally, for communications networks utilizing satellite constellations, it is important that all of the orbital planes of the constellation precess at precisely the same rate or else a hole would open in the constellation.

Thus, in any satellite constellation a, e, and I of the above formula are substantially the same for each orbital plane, i.e. for all satellites in the constellation.

Figure 3:
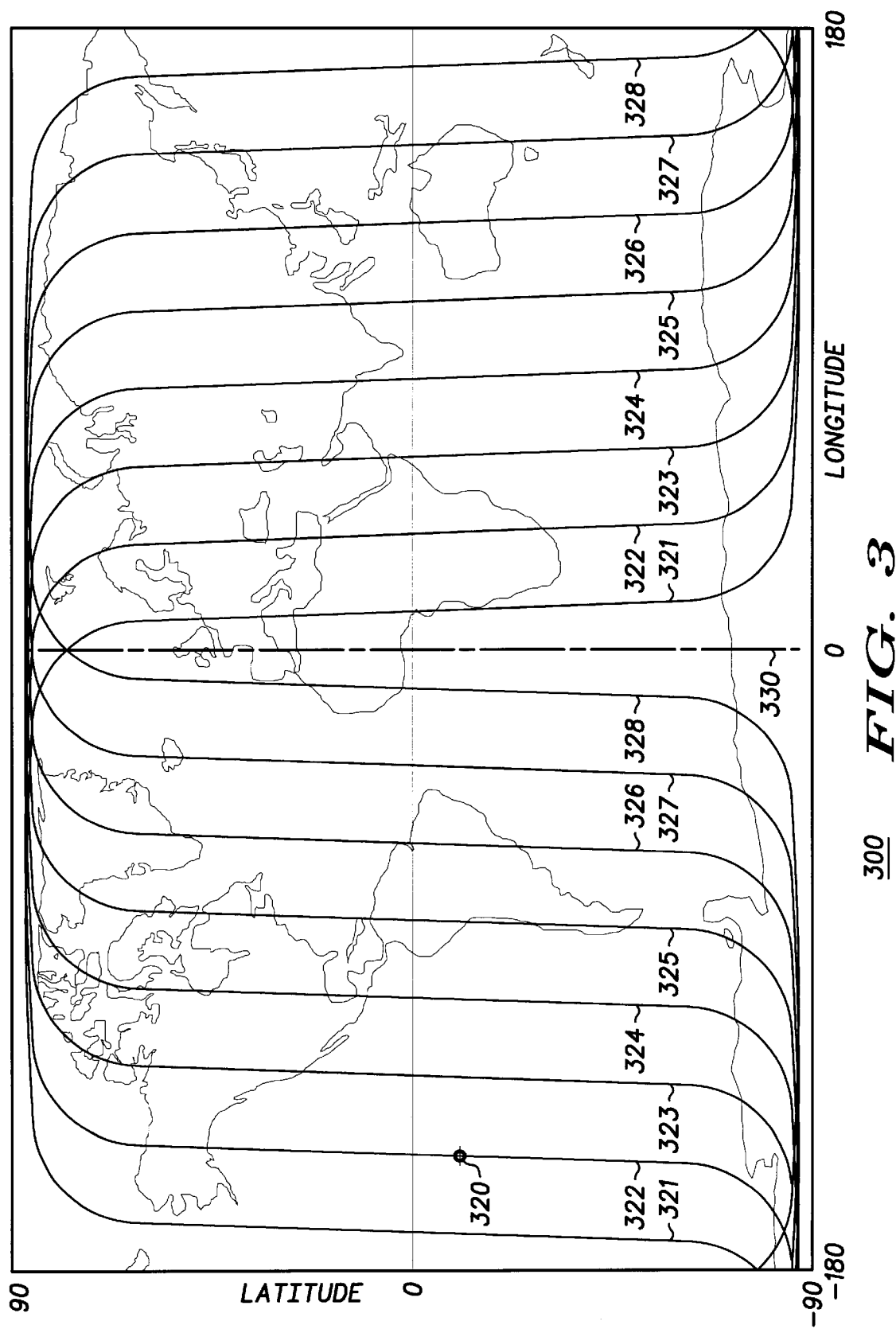
FIG. 3 illustrates a plan view of an eight plane satellite constellation in accordance with a preferred embodiment of the present invention.

FIG. 3 illustrates a plan view of an eight-plane satellite constellation in accordance with a preferred embodiment of the present invention. In this specific example, the satellite constellation includes eight orbital planes, and their ground tracks are designated 321 through 328. Each plane including a plurality of spaced apart satellites, illustrated by 320.

Seam 330 is also illustrated in FIG. 3. Satellites ground tracks to the left of seam 330 illustrate northbound satellites, and satellite ground tracks to the right of seam 330 illustrate southbound satellites. Seam 330 is not required for the invention. In alternate embodiments, the ground tracks could be used to illustrate satellites moving in either direction or in both directions. In addition, those skilled in the art will recognize that the grounds tracks can move or remain stationary with respect to the surface of the earth.

Desirably, each orbital plane 321 through 328 is spaced a substantially equal distance from each adjacent plane. That is, the distance between orbital planes 321 and 322 is substantially equal to the distance between orbital planes 322 and 323, etc. This exact distance is maintained by making the planes 321 through 328 precess at substantially the same rate.

However, by varying the precession rate, W, slightly between orbital planes the size of the seam between two adjacent counter-rotating orbital planes can be changed, i.e. seam 330 between orbital planes 328 and 321, of the plurality of orbital planes illustrated in FIG. 3. The precession rate can be easily and accurately varied by varying one of: the semimajor axis, the eccentricity, and the inclination for one or more of the orbital planes 321 through 328.

In a preferred embodiment, by varying at least one of the variables (a, e, or i) in the formula for w for each orbital plane 321 through 328, orbital planes 321 through 328 are moved closer together, and seam 330 between adjacent counter-rotating orbital planes 328 and 321 is made wider. An additional plane of satellites is then inserted into this widened seam. In this fashion, the orbital plane separation distance could continually decrease at a predefined rate, allowing for systematic insertion of new planes and an increase in system capacity. For example, the number of planes could incrementally grow from 6 to 7 to 8, etc.

For example, in an orbital constellation at 850 km, a difference of 0.1 degrees in inclination (i) provides a relative rate change of 0.01 degrees per day. It will take approximately one year at this rate to open a seam sufficiently large to allow the insertion of an additional orbital plane. At this rate, the system capacity could grow 10 to 15 per cent in the first year. At any time that the system has grown to a desired capacity, or it is desired to stop growth for any reason, the precession rate can be easily returned to precisely the same rate.

In an alternate embodiment, by varying the precession rate, W, slightly between orbital planes the separation distance between two adjacent orbital planes can be changed, i.e. between orbital planes 324 and 325, of the plurality of orbital planes illustrated in FIG. 3. For example, by varying at least one of the variables (a, e, or i) in the formula for w for each orbital plane 321 through 328, orbital planes 321 through 324 can be moved closer together and orbital planes 325 through 328 can be moved closer together. In this manner, the separation distance between orbital planes 324 and 325 can be made larger. An additional plane of satellites can then be inserted into this increased space between orbital planes 324 and 325. In this fashion, the orbital plane separation distance could continually decrease at a predefined rate, allowing for systematic insertion of new planes and an increase in system capacity.

In alternate embodiments, the constellation growth can be achieved using other techniques. From the above formula, the precession rate is inversely proportional to the altitude (a is the semi-major axis in km). If the constellation is initially deployed with six orbital planes, and the altitude of each plane is later slightly decreased, then in a very controlled way, the distance between all orbital planes would decrease and a hole would open at the seam for insertion of another orbital plane. In this fashion, the orbital planes will continually decrease in distance at any predefined rate, allowing for systematic insertion of new planes and an increase in system capacity. If at any time it were desirable to stabilize the size of the constellation, only a small altitude change would be required. The amount of satellite fuel required to perform this altitude change is orders of magnitude less than the fuel required to perform a plane change.

Figure 4:
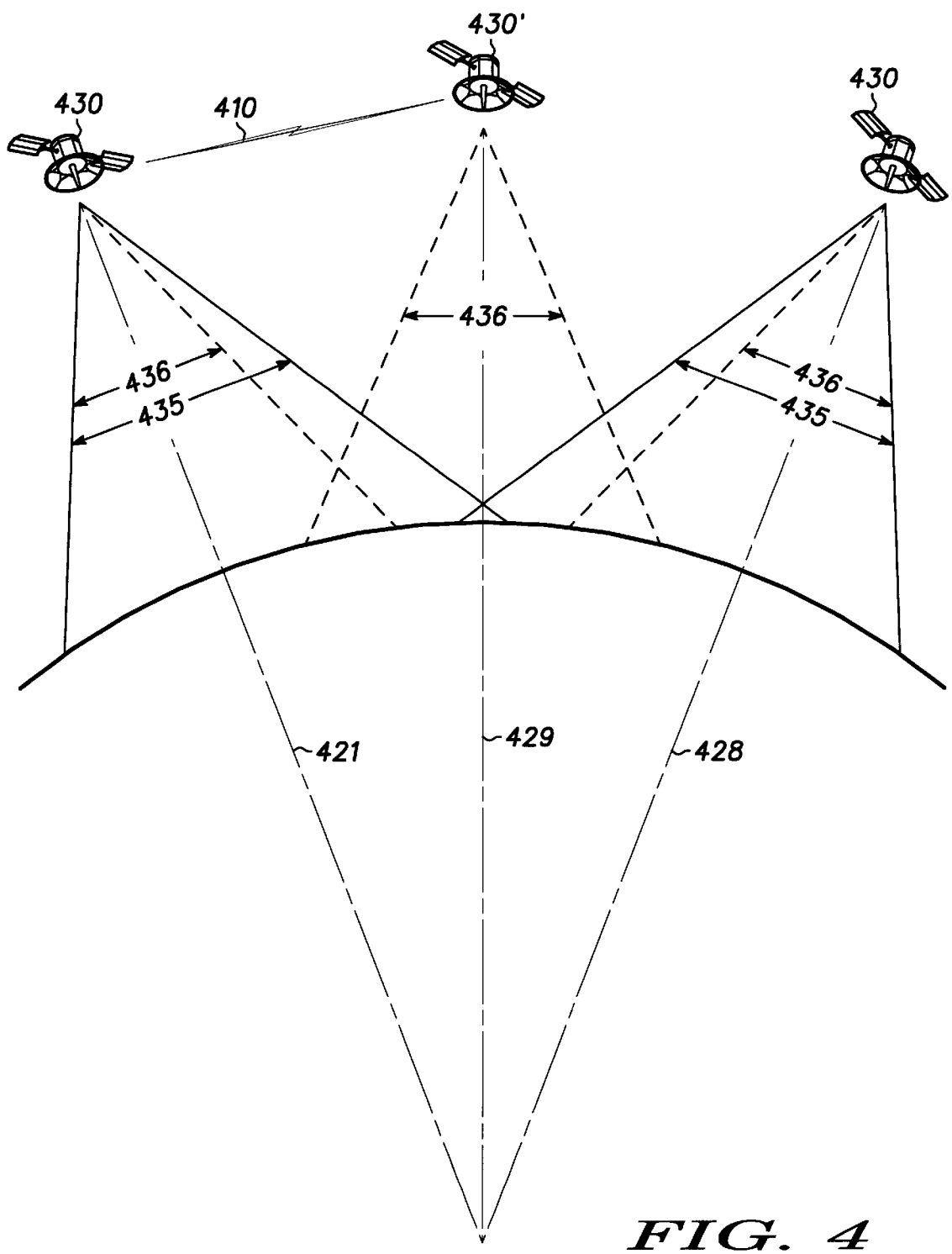
FIG. 4 illustrates a highly simplified diagram of a satellite beam patterns in accordance with a preferred embodiment of the present invention.

FIG. 4 illustrates a highly simplified diagram of satellite beam patterns in accordance with a preferred embodiment of the present invention. In this view, satellite beam patterns 435 and 436 for satellites 430 in each of orbital planes 421 and 428 are illustrated schematically. Generally, beam patterns are formed so as to slightly overlap adjacent beam patterns on the Earth's surface. In an ideal situation beam pattern edges would meet exactly without overlap. Satellite beam pattern 435 illustrates the beam pattern before a new plane 429 of satellites 430' has been deployed, and satellite beam pattern 436 illustrates the beam pattern after the new plane 429 of satellites 430' has been deployed.

When a new orbital plane 429 is inserted into the constellation, the modified beam patterns 436 would ideally overlap slightly. However, in many applications, this ideal situation may not occur, and in such instances, it will be desirable to incorporate satellites with beam patterns that can be modified to provide the desired coverage.

When a new orbital plane 429 is inserted into the constellation, at least one set of crosslinks 410 are established between the satellites 430' and satellites 430. However, in many applications, this ideal situation may not occur, and in such instances, it will be desirable to incorporate satellites with beam patterns that can be modified to provide the desired coverage.

The satellite parameters and the crosslink parameters are controlled so that the crosslinks between satellites in different orbital planes are maintained when the orbital planes move with respect to one another. In addition, the satellite parameters and the crosslink parameters are controlled so that the crosslinks between satellites in the same orbital planes are also maintained when the orbital planes move with respect to one another.

Thus, a new and improved method of providing growth in a satellite constellation has been disclosed, the growth being in an incremental fashion without interrupting service. In addition, the method of growth can be performed using present satellites and without requiring excessive amounts of fuel to perform the changes. Further, the method can be used to grow the constellation to any desired size and can be stopped at any time. Through the use of the described method, initial costs for satellite constellations can be minimized with increases in capacity being performed at any convenient later date or period of time. This method can also aid in reducing the size of satellites because they can be designed for reduced initial capacity.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In conjunction with a satellite constellation including a plurality of satellites in a plurality of orbital planes with each of the orbital planes precessing at a precession rate, a method of inserting a new orbital plane in the satellite constellation comprising the steps of:

determining the precession rate for each of the orbital planes according to $W=k(a^{-7/2})(\cos i)(1-e^2)^{31\,2}$, where k is substantially equal to $-2.06474 \times 10^{14}$, a is the semi-major axis, e is the eccentricity, and i is the inclination;

varying at least one of the variables a, e, and i to increase a separation distance between two adjacent orbital planes of the plurality of orbital planes; and inserting a new orbital plane between the two adjacent orbital planes.

2. The method as claimed in claim 1, wherein the step of varying one of the variables a, e, and i includes performing a gradual variation to increase the separation distance over a period of time.

3. The method as claimed in claim 2, wherein the step of varying one of the variables a, e, and i includes gradually varying i, the inclination, to increase the separation distance over a period of time.

4. The method as claimed in claim 3, wherein the step of gradually varying i, the inclination, to increase the separation distance over the period of time includes varying the inclination to provide a relative rate change of at least 0.01 degrees per day.

5. The method as claimed in claim 3, wherein the step of gradually varying i, the inclination, to increase the separation distance over the period of time includes varying the inclination to provide a relative rate change of less than 0.01 degrees per day.

6. The method as claimed in claim 1 wherein the step of varying one of a, e, and i is performed to a different degree on each orbital plane of the plurality of orbital planes.

7. The method as claimed in claim 1 further comprising the step of modifying satellite beam patterns to handle changes to separation distances between planes subsequent to the step of inserting the new orbital plane.

8. The method as claimed in claim 1 further comprising the step of modifying satellite beam patterns to handle changes to separation distances between planes after the step of inserting the new orbital plane.

9. The method as claimed in claim 1 further comprising the step of modifying inter-satellite links to handle changes to separation distances between planes subsequent to the step of inserting the new orbital plane.

10. The method as claimed in claim 1 further comprising the step of modifying inter-satellite links to handle changes to separation distances between planes after the step of inserting the new orbital plane.

* * * * *